United States Patent Office 3,166,530
Patented Jan. 19, 1965

3,166,530
POLYOXYMETHYLENE COMPOSITIONS STABILIZED WITH POLYMETHYLENE POLYUREAS
Tamotsu Eguchi, Kurashiki, Japan, assignor to Kurashiki Rayon Company Limited, Kurashiki, Japan, a corporation of Japan
No Drawing. Filed Oct. 3, 1961, Ser. No. 142,509
Claims priority, application Japan, Apr. 22, 1961, 14,421/61
3 Claims. (Cl. 260—45.9)

The present invention relates to a new composition which consists of polyurea or polythiourea mixed with polyoxymethylene.

The principal object of the invention is to provide high molecular weight polyoxymethylene compositions which can produce plastics, fibers and films having satisfactory thermal stability and mechanical properties.

Polyoxymethylene after polymerization is a high molecular weight polymer consisting of —($CH_2O$)—unit in base chain, which end group is hydroxyl group.

Accordingly it is liable to be affected by the following three undesirable chemical changes:
(1) Degradative depolymerization, starting on both ends of the polymer chain.
(2) Fission induced by the autooxydation of the methylene group in the main chain.
(3) Hydrolysis and acidolysis of ether bond in the main chain.

The above reaction (1) mainly occurs at high temperatures, and in reaction (2), main chain is splitted to two divisions after decomposition of hydroperoxide oxidized $CH_2$-group by oxygen or oxidizing agent. While, reaction (3) is violently caused mainly by water or acids, i.e. $H^+$.

In useful methods which have heretofore been taken for preventing these undesirable reactions and for preparing stable polymer, there are end group-stabilization by the introduction of acetate group, acyl group, ether group, etc., which replace the hydroxyl end group on base chain, and the stabilization of the main chain by the addition of various stabilizers such as radical inhibitor, antioxidant or acid accepter etc.

The present invention relates to the above last stabilization methods, and it is preferable to unformly disperse 0.1 to 15 weight percent of polyurea or polythiourea in polyoxymethylene. Even if such polyurea or polythiourea is mixed with polyoxymethylene after the polymerization, there is almost no change in the effect of stabilization from that when it was mixed before the polymerization (polyurea and polythiourea are effective catalyst for the polymerization of formaldehyde) and also the mixing may be done by any method, such as, by using a dry-blender or by mixing after dissolved in solvent.

The term "polyurea" used in the specification refers to high molecular weight polymethylene-polyurea and co-condensation products or derivatives thereof, which can be produced by polyaddition reaction or polycondensation reaction of di-isocyanate or urea with diamine. The term "polythiourea" used in the specification is to be understood to means high molecular weight polymethylene-thiourea and copolymerization products and derivatives thereof, which can be formed by the polyaddition reaction or polycondensation reaction of di-isocyanate or thiourea with diamine.

The term "polyoxymethylene" used in the specification means inclusively polymers having polymer linking, which consists of —($CH_2O$)—, the end group of which may be hydroxyl group, alkyl group, carboxyl group or any other group. As already known, the end group which is esterified has better thermal stability. In addition, other additions agents, such as, pigments, fillers and antioxidants are included also in the compositions of the invention.

An embodiment of the invention will be explained with examples in the following:

In carrying out the examples, polyurea and polythiourea were dissolved in an organic solvent respectively and poured into precipitant to reprecipitate, and then dried and passed through the sieve of 60 meshes. Polyoxymethylene was polymerized by blowing polymerization or vapour phase polymerization or other various polymerization processes, and afterwards, it was finely ground in a mortar and its intrinsic viscosity was determined by measuring $\eta sp./c.$ of a 2 to 7 g./l. solution of p-chlorophenol containing 2% α-pinene at 60° C.

For the thermal decomposition tests, 0.15 to 0.25 g. of polyoxymethylene and polyoxymethylene composition (in the form of thin film) was used. The film was packed in a subcutaneous injector of 50 cc. content containing about 1.5 cc. of silicon oil and after the injector has been sufficiently replaced with nitrogen. It was placed in a horizontal electric furnace and the position of the piston was read each 10 minutes at 222° C. and the thermal stability (abridged at "TS" hereafter, its unit is expressed by cc./10 min./g.) was determined by the quantity of gases generated. The film prepared by pressing uniformly mixed polymer powders between two sheets of plated iron plates with chromium maintained at 180 to 190° C. for 2 to 5 minutes. It was found that the quantity of gases generated is different according to the shape of the sample even with the same sample, for instance, the TS-value is larger in case of thin film than that of tip shape. Accordingly care was taken to make the thickness of the film to become 0.25±0.05 mm. Polyoxymethylene used in the examples, after polymerization, was acetylated with a mixed solution of anhydrous acetic acid and sodium acetate at 140° C. for 40 minutes, and then filtered and washed with acetone and dried in vacuo, then pulverized.

Example 1

The acetylated product (having intrinsic viscosity of 1.54 dl./g.) of polyoxymethylene which was prepared by the vapour phase polymerization initiated by nonamethylene polyurea powders (having intrinsic viscosity of 0.22 dl./g. in m-cresol at 30° C., prepared by the condensation polymerization of nonamethylene diamine and urea) was pressed in the form of film to measure TS-value. The TS-values of various samples (formed in the shape of film) consisting of mixtures of acetylated product of polyoxymethylene (having intrinsic viscosity of 2.87 dl./g.) polymerized by means of blowing process (in n-hexane solution of tributyl amine) and the above nonamethylene polyurea were measured. The results are shown in the following:

| Polyurea in sample (wt. percent) | Addition of polyurea | TS-value at 222° C. (cc./10 min./g.) | | | |
|---|---|---|---|---|---|
| | | 0–10 min. | 10–20 min. | 20–30 min. | 30–40 min. |
| 0.77 | Before polymerization | 23 | 80 | 65 | 35 |
| 0 | After polymerization | 40 | 250 | 620 | |
| 0.5 | do | 25 | 105 | 90 | 58 |
| 1.0 | do | 22 | 75 | 50 | 34 |
| 5.0 | do | 15 | 60 | 50 | 25 |
| 10.0 | do | 13 | 50 | 42 | 21 |

All films added with nonamethylene polyurea had passed the bending test of 100 times.

Example 2

Acetylated product (having intrinsic viscosity of 1.58 dl./g.) of polyoxymethylene which was prepared by vapour phase polymerization using hexamethylene polyurea powders (as catalyst) having intrinsic viscosity of 0.18 dl./g. (in m-cresol at 30° C.) made by condensation polymerization of hexamethylene diamine and urea was added with 1 weight percent of 2.6-di-tert.-butyl-p-cresol (antioxidant) and it was moulded in the shape of film to measure the TS-value. The acetylated product of polyoxymethylene (having intrinsic viscosity of 1.28 dl./g., polymerized by means of blowing process in n-hexane solution of tributylamine) and the above hexamethylene polyurea and 0.5 weight percent of a blended antioxidant were mixed together. The mixture was moulded to the shape of film and its TS-value was measured. The results are shown in the following:

| Polyurea urea of sample (wt. percent) | Addition of polyurea | Antioxidant in sample (wt. percent) | TS-value at 222° C. (cc./10 min./g.) | | | |
|---|---|---|---|---|---|---|
| | | | 0–10 min. | 10–20 min. | 20–30 min. | 30–40 min. |
| 1.6 | Before polymerization | ¹ A 1.0 | 23 | 45 | 50 | 30 |
| 0 | After polymerization | ² B 0.5 | 55 | 225 | | |
| 0.5 | do | ² B 0.5 | 45 | 85 | 115 | |
| 1.0 | do | ² B 0.5 | 23 | 45 | 55 | 30 |
| 5.0 | do | ² B 0.5 | 30 | 40 | 50 | 35 |

¹ A. 2,6-di-tert.-butyl-p-cresol.
² B. Blend of phenylene-β-naphthylamine and diphenyl-p-phenylene diamine.

Above all films had passed the bending tests of hundred times.

What I claim is:
1. A polyoxymethylene composition comprising solid high molecular weight polyoxymethylene and incorporated therein a high molecular weight polymethylene polyurea in an amount of 0.001 to 20 percent by weight of the composition.
2. A polyoxymethylene composition comprising solid high molecular weight polyoxymethylene and incorporated therein a high molecular weight polymethylene polyurea in an amount of 0.1 to 15 percent by weight of the composition.
3. A shaped article made of polyoxymethylene compositions according to claim 2.

References Cited by the Examiner
UNITED STATES PATENTS

| | | | |
|---|---|---|---|
| 2,296,249 | 9/42 | Austin et al. | 260—67 |
| 2,813,783 | 11/57 | Gleim | 260—45.9 |
| 2,893,972 | 7/59 | Kubico et al. | 260—45.9 |
| 2,960,488 | 11/60 | Tamblyn et al. | 260—45.9 |
| 2,973,342 | 2/61 | Inaba et al. | 260—553 |
| 2,985,623 | 5/61 | Schweitzer et al. | 260—67 |

FOREIGN PATENTS 876,515  9/61  Great Britain.

LEON J. BERCOVITZ, *Primary Examiner.*

MILTON STERMAN, J. R. LIBERMAN, *Examiners.*